(12) United States Patent
Eubanks

(10) Patent No.: US 12,527,890 B2
(45) Date of Patent: Jan. 20, 2026

(54) SYSTEMS AND METHODS FOR GENERATING SCENTS

(71) Applicant: Micheon Eubanks, San Francisco, CA (US)

(72) Inventor: Micheon Eubanks, San Francisco, CA (US)

(*) Notice: Subject to any disclaimer, the term of this patent is extended or adjusted under 35 U.S.C. 154(b) by 993 days.

(21) Appl. No.: 17/687,047

(22) Filed: Mar. 4, 2022

(65) Prior Publication Data

US 2022/0296761 A1 Sep. 22, 2022

Related U.S. Application Data

(60) Provisional application No. 63/162,471, filed on Mar. 17, 2021.

(51) Int. Cl.
*A61L 9/03* (2006.01)
*C11B 9/00* (2006.01)

(52) U.S. Cl.
CPC ............ *A61L 9/035* (2013.01); *C11B 9/0003* (2013.01); *A61L 2209/11* (2013.01)

(58) Field of Classification Search
CPC .................... A61L 9/02; A61L 9/035
See application file for complete search history.

(56) References Cited

U.S. PATENT DOCUMENTS

2008/0142624 A1* 6/2008 Ivri .................. A45D 34/02
239/690
2014/0377130 A1* 12/2014 Edwards .......... G05B 15/02
422/5

OTHER PUBLICATIONS

PCBcart Printed Circuit Board Terminology. https://www.pcbcart.com/article/content/glossary-of-terms.html. Wayback Machine Capture Nov. 28, 2020 (Year: 2020).*

* cited by examiner

*Primary Examiner* — Donald R Spamer
(74) *Attorney, Agent, or Firm* — Sam Pierce

(57) ABSTRACT

A method of generating scents, the method including receiving, by a processor, an instruction to generate a first scent, and heating, responsive to the instruction to generate the first scent, a first scented material.

16 Claims, 14 Drawing Sheets

SYSTEMS AND METHODS FOR GENERATING SCENTS

CROSS REFERENCE TO RELATED APPLICATION

This application claims the benefit of, and incorporates by reference, U.S. provisional patent application Ser. No. 63/162,471, entitled "Systems and Methods for Generating Scents," which was filed on Mar. 17, 2021.

BACKGROUND

1. Field

This present general inventive concept relates generally to producing a scent in response to receiving instructions, and specifically, a system of producing scents in response to receiving digital and/or analog instructions, and a method thereof.

2. Description of the Related Art

Digital media, whether it is informational, for advertisement, educational, entertainment related, etc., is typically limited to audio and visual stimuli. The sense of smell is underutilized and can potentially enhance all forms of media.

There is a need in the art for a system and method of communicating scents through digital and/or analog media.

SUMMARY

The present general inventive concept provides a system for generating scents, and a method thereof.

A general aspect of the invention is a method for generating scents. The method includes receiving, by a processor, an instruction to generate a first scent and heating, responsive to the instruction to generate the first scent, a first scented material. The first scented material may be a composition that includes a wax and a scent producing chemical. The heating may include generating current through a high resistance wire where the high resistance wire is in thermal contact with the scented material. The method may further include receiving, by the processor, an instruction to generate a second scent and heating, responsive to the instruction to generate the second scent, a second scented material. The first scented material and second scented material may be compositions that include a wax and a scent producing chemical. The wax may be selected from the group consisting of paraffin wax, soy wax, and bees wax. The scent producing chemical may be selected from the group consisting of essential oil, perfume, and cologne. Each composition may further include a ratio of wax to scent producing chemical of about 9 to 1. Each composition may further include a ratio of wax to scent producing chemical of about 24 to 1. The high resistance wire may include nichrome wire. Each composition may be suspended in a circular shielded copper frame that is wrapped with the nichrome wire.

An exemplary embodiment is a scent generating apparatus, the scent generating apparatus includes a processor connected to memory and a storage, two or more scented materials where each of the two or more scented materials are in thermal contact with a heating element. The processor is configured to receive an instruction to generate a first scent. The heating element is configured to burn at least one scented material responsive to the instruction to generate a first scent. Each of the two or more scented materials may be a composition that includes a wax and a scent producing chemical. The wax may be selected from the group consisting of paraffin wax, soy wax, and bees wax. The scent producing chemical may be selected from the group consisting of essential oil, perfume, and cologne. Each composition may further include a ratio of wax to scent producing chemical of about 9 to 1. Each composition may further include a ratio of wax to scent producing chemical of about 24 to 1. The high resistance wire may include nichrome wire. Each composition may be suspended in a circular shielded copper frame that is wrapped with the nichrome wire.

Another general aspect is a computer readable storage medium in a scent burner having data stored therein representing a software executable by a computer, the software comprising instructions that, when executed, cause the scent burner to perform receiving, by a processor, an instruction to generate a scent and heating, responsive to the instruction, a high resistance wire that is in thermal contact with one or more scented materials. Each of the one or more scented materials may be a composition that includes a wax selected from the group consisting of paraffin wax, soy wax, and bees wax and a scent producing chemical selected from the group consisting of essential oil, perfume, and cologne.

The present general inventive concept provides a system and method for generating scents.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method for generating scents, the method including receiving, by a processor, an instruction to generate a first scent, and heating, responsive to the instruction to generate the first scent, a first scented material.

The first scented material may be a composition, the composition including a wax, and a scent producing chemical.

The heating may include generating current through a high resistance wire, and the high resistance wire is in thermal contact with the scented material.

The method may further include receiving, by the processor, an instruction to generate a second scent, and heating, responsive to the instruction to generate the second scent, a second scented material.

The first scented material and the second scented material may be compositions, each composition including a wax, and a scent producing chemical.

The wax may be selected from the group consisting of paraffin wax, soy wax, and bees wax.

The scent producing chemical may be selected from the group consisting of essential oil, perfume, and cologne.

Each composition may further include a ration of wax to scent producing chemical of at least one of 9 to 1 and 24 to 1.

The high resistance wire may include nichrome wire.

Each composition may be suspended in a circular shielded copper wire that is wrapped with the nichrome wire.

The foregoing and/or other features and utilities of the present general inventive concept may also be achieved by providing a scent generating apparatus connected to a digital media device, the scent generating apparatus including a processing circuit to identify a type of scent in response to receiving an encoded marker from the digital media device, and at least one heating element to generate a scent in response to receiving a command from the processing circuit.

The at least one heating element may include at least one scent producing material, and a high resistance wire connected to the at least one scent producing material to generate the scent by heating the at least one scent producing material and convert at least a portion of the at least one scent producing material into a gaseous state.

The at least one scent producing material may include at least one of a wax, an essential oil, a perfume, a cologne, incense, tobacco, a gel, a rubber, a paste, a glue, and a fiber.

The wax may be constructed of at least one of paraffin wax, soy wax, and bees wax.

The at least one heating element may further include a shielded wire connected to the high resistance wire to suspend the at least one scent producing material therein.

The high resistance wire may be at least partially wrapped around the shielded wire.

The at least one heating element may further include an ancillary tube connected to the high resistance wire to extract the scent from the at least one scent producing material therethrough in response to heating the high resistance wire.

The scent generating apparatus may further include a printed circuit board to connect the processing circuit to the at least one heating element.

The printed circuit board may generate multiple scents using an array of the at least one heating element.

The foregoing and/or other features and utilities of the present general inventive concept may also be achieved by providing a scent generating apparatus connected to a digital media device, the scent generating apparatus including a printed circuit board have an array of pins, a processing circuit disposed on at least a portion of the printed circuit board to identify a type of scent in response to receiving an encoded marker from the digital media device, and a plurality of heating elements disposed within at least a portion of the array of pins to generate at least one scent in response to receiving a command from the processing circuit.

At least one of the plurality of heating elements may receive a current in response to the processing circuit opening a circuit on the array of pins.

The plurality of heating elements may generate the at least one scent based on a combination of the array of pins receiving a current.

The at least one scent may be generated by heating a scent producing material comprising at least one of a wax, an essential oil, a perfume, a cologne, incense, tobacco, a gel, a rubber, a paste, a glue, and a fiber.

The plurality of heating elements may generate the at least one scent based on a combination of the plurality of heating elements activated.

At least one of the plurality of heating elements may remain inactive while the at least one scent is generated.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
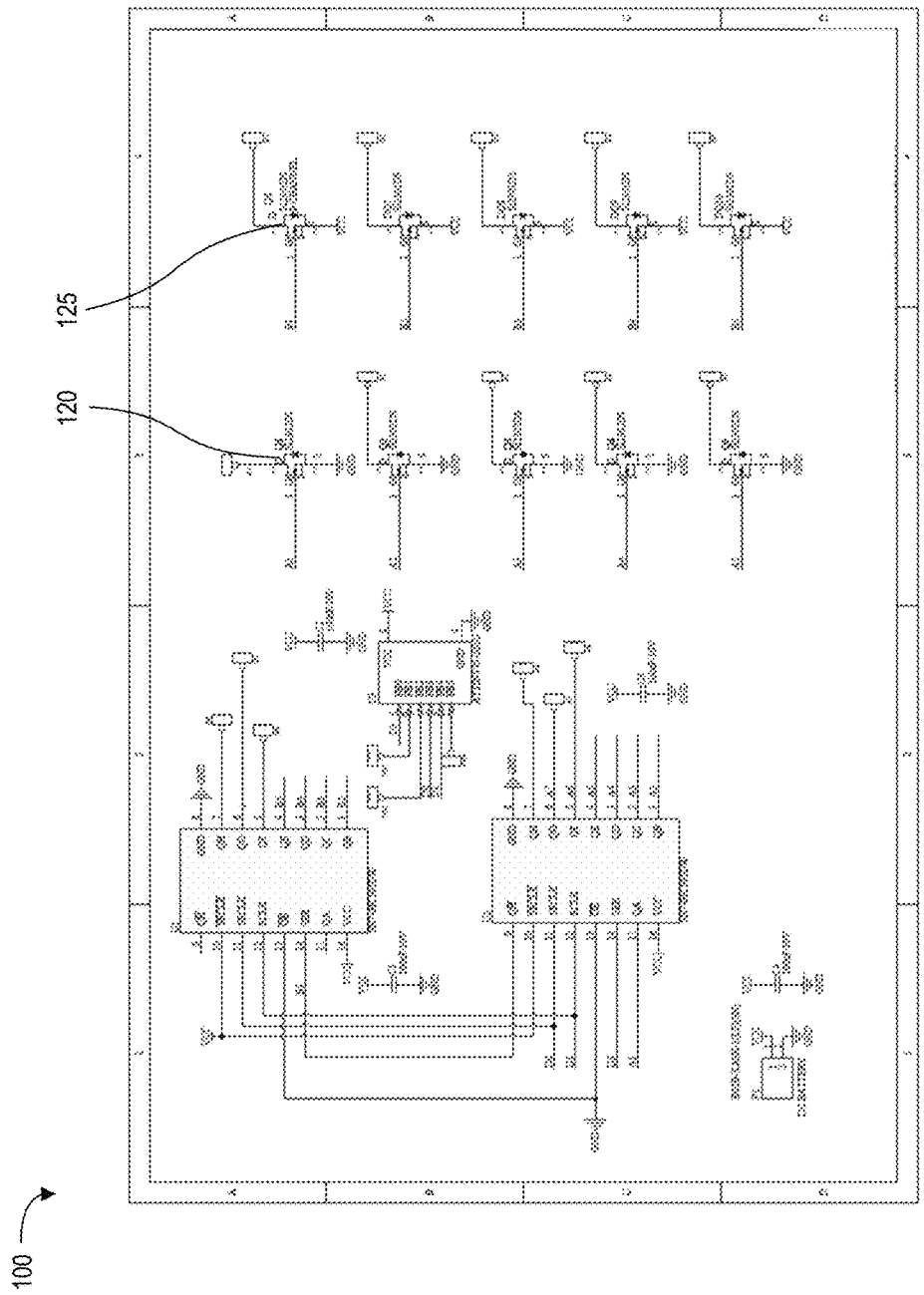
FIG. 1 is a schematic of a circuit of an embodiment of the disclosed invention.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

The disclosed subject matter includes systems and methods for generating scents. A system may include a processor that can receive instructions to generate one or more scents. The processor may transmit a command that, when executed, burns one or more scented materials to produce a scent. The one or more scented materials may comprise a composition of a wax and a scented chemical. The one or more scented materials may also and/or alternatively include a composition any other material that generates a scent. The system may be a computing device that determines the one or more scents based on a program. The scented materials may also be referred to as scent producing materials, and may include, but are not limited to, at least one of a wax, an essential oil, a perfume, a cologne, incense, tobacco, a gel, a rubber, a paste, a glue, and a fiber.

The composition may be suspended in a heating element that is in thermal contact with a high resistance wire such as nichrome or Kanthal. When the processor transmits the instruction to generate a scent, an execution of the instruction may cause current to flow through the high resistance wire, which rapidly heats the wire and burns the composition. A scent is generated as the composition burns and gasses are released. The composition may be a single scent and/or a combination of a plurality of scents.

The one or more compositions of scented materials may be suspended in a circle of shielded wire that is about 4 mm in diameter. In various embodiments, the circle of shielded wire may be from about 1 mm in diameter to about 20 mm in diameter. Further, the circle of shielded wire may comprise various other shapes that can suspend the composition including, but not limited to flat plane, capsule, hexagon, pretzel, paper clip, and star shapes. Also, the circle of shielded wire may have a diameter less than 1 mm or greater than 20 mm.

An array of heating elements with compositions of scented material suspended in them may be connected to a circuit with a processor. The various heating elements in the array may each hold a unique scented material. The processor may transmit an instruction that selects a specific scent to be generated, whereby current may flow through only the unique heating element to burn the composition while leaving the other heating elements in the array inactivated. The array of heating elements may generate different scents based on a number of heating elements that are activated.

In various embodiments, the processor may receive an instruction from a wireless transmission such as Bluetooth. Upon receiving the wireless transmission, the processor may select and generate a scent. In other words, the wireless transmission may be part of a communication unit.

Referring to FIG. 1, FIG. 1 is a schematic of a processing circuit 100 of an embodiment of the disclosed invention. The circuit may include a processor, a memory, and a storage. In various embodiments, the processor may execute instructions that cause the processor to generate scents. The processor may further receive instructions from digital and/or analog media to generate a specific scent at a specific time. Various types of digital and/or analog media that may transmit instructions to generate a scent include, but are not limited to advertisements, educational resources, cooking recipes, live streams, virtual reality presentations, augmented reality presentations, podcasts, movies, TV shows, and video games. Furthermore, the circuit may include a device capable of wireless or wired communication between other wireless or wired devices via at least one of Wi-Fi, Wi-Fi Direct, infrared (IR) wireless communication, satellite communication, broadcast radio communication, Microwave radio communication, Zigbee, near field communication (NFC), and radio frequency (RF) communication, USB, global positioning system (GPS), Firewire, and Ethernet. Accordingly, the processor may receive instructions through digital media via the communication unit.

The processing circuit 100 may cause current to flow through high resistance wire to burn a scented material and generate a scent. The scented material may be arranged in an N×N array. A unique scented material within the N×N array may be selected by receiving a row number of the array and a column number of the array. The high resistance wire may be disposed within at least a portion of the N×N array, such as at least one row number and/or at least one column number. Thus, a plurality of combinations may be created depending on which row number and/or column number are used.

The processing circuit 100 shows an array of 5 N-channel MOSFET transistors 120 labeled as Q1-Q5. Also, the processing circuit 100 shows an array of 5 P-channel MOSFET transistors 125 labeled as Q6-Q10. As such, the processing circuit 100 shown in FIG. 1 may be connected to a 5×5 array of heating elements that can generate 25 separate unique scents. In various embodiments, the number of heating elements in the array may be bigger or smaller. The processing circuit 100 may select a unique heating element by causing one of the N-channel MOSFET transistors 120 to connect a circuit to ground. The processing circuit 100 may further cause one of the P-channel MOSFET transistors 125 to connect a circuit to a voltage source. The resulting circuit, created by opening the N-channel MOSFET transistor and P-channel MOSFET transistor may cause current to flow through a unique heating element depending on the number of N-channel MOSFET transistors 120 and P-channel MOSFET transistors 125. As such, the processing circuit 100 may use a switch to open and/or close a circuit to the N-channel MOSFET transistor and/or the P-channel MOSFET transistor.

The disclosed invention is not limited to the use of MOSFET transistors to select a unique scented. Instead, the schematic of MOSFET transistors is intended to demonstrate a working prototype of the scent generator. For example, other types of transistors may include a bipolar junction transistor (BJT), a field-effect transistor (FET), and/or an insulated gate bipolar transistor (IGBT).

Figure 2:
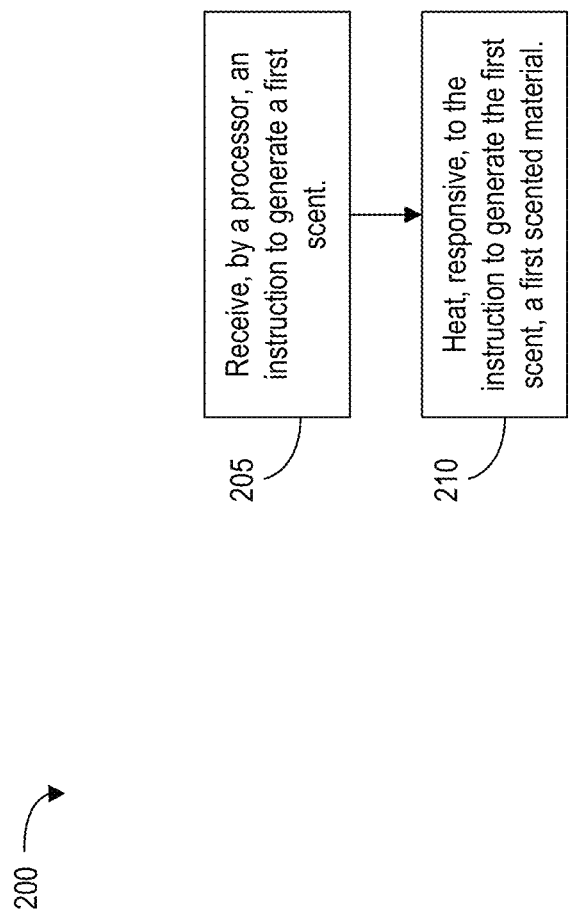
FIG. 2 is a flow diagram of a process for generating a scent.

Referring to FIG. 2, FIG. 2 is a flow diagram 200 of a process for generating a scent. The process may be used to generate scents responsive to commands received from digital media. At step 205, the process may receive, by a processor, an instruction to generate a first scent. The instruction may specify a scent to be generated. For example, the scent may be related to an overall digital media presentation. In other words, the scent may generated may correspond go to content within the digital media presentation (e.g., a rose scent generated based on a rose depicted in a movie).

At step 210, the process may heat, responsive to the instruction to generate the first scent, a first scented material. The first scented material may be a unique composition that is in thermal contact with a heating element. The heating element may burn the first scented material to burn it and generate the scent. More specifically, the N-channel MOSFET transistor and/or the P-channel MOSFET transistor may receive a current therethrough in response to the processing unit facilitating passage of the current to increase a temperature level, such that the first scented material burns.

Figure 3:
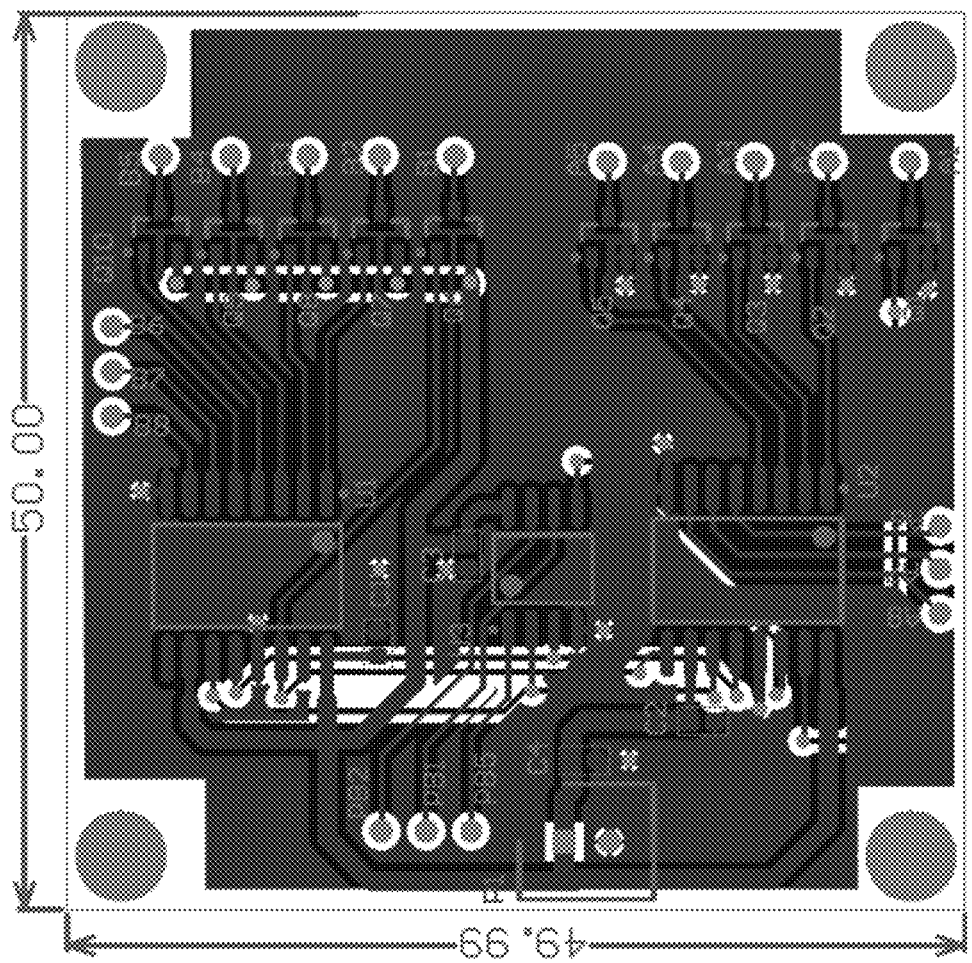
FIG. 3 is a schematic of a PCB board for a processing circuit in an embodiment of the disclosed invention.

Referring to FIG. 3, FIG. 3 is a schematic of a PCB board 300 for a processing circuit in an embodiment of the disclosed invention. The PCB board 300 comprises the N-channel MOSFET transistors Q1-Q5 and P-channel MOSFET transistors Q6-Q10. The N-channel MOSFET transistors are connected to I/O pins A1-A5. The P-channel MOSFET transistors are connected to I/O pins B1-B5. The processing circuit 100 may open an individual MOSFET transistor by sending a signal to the I/O pins. For example, the processing circuit 100 may open Q5 by sending a signal to A5. Similarly, the processing circuit may open Q10 by sending a signal to B5. The 25 different combinations of (A1-A5)×(B1-B5) may select one of 25 different scented materials to burn. It is important to note that the I/O pins may correspond to the aforementioned switch manipulated by the processing circuit 100.

Figure 4:
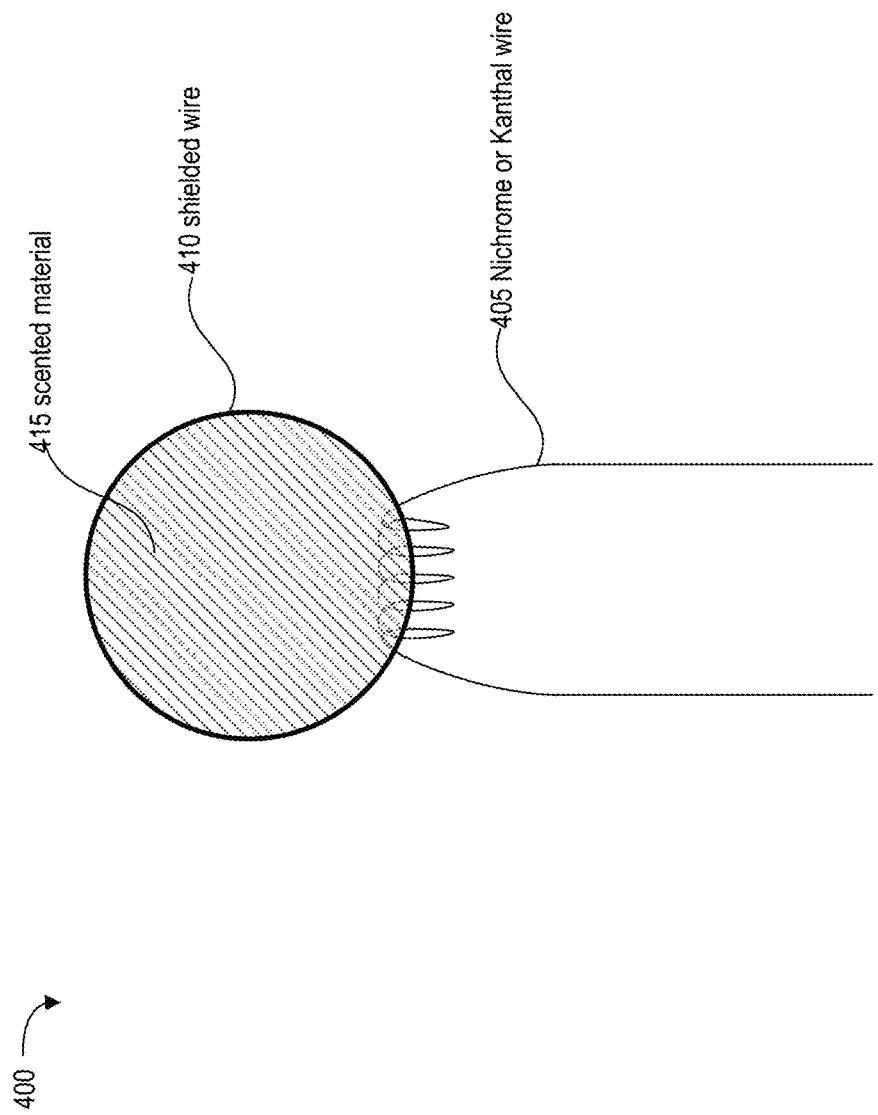
FIG. 4 is an illustration of a heating element that holds a scented material.

Referring to FIG. 4, FIG. 4 is an illustration of a heating element 400 that holds a scented material. The heating element 400 comprises a high resistance wire 405 that is in thermal contact with a scented material 415. When current flows through the high resistance wire, it heats and burns the scented material. Various materials may comprise the high resistance wire. In exemplary embodiments, the high resistance wire comprises nichrome wire, Kanthal wire, or aluminum wire. The scented material 415 may convert into a gaseous state in response to an increase in the temperature level of the high resistance wire. In other words, the high resistance wire may be configured to generate heat at a predetermined temperature level such that the scented material 415 may change into a gas.

In the exemplary embodiment shown in FIG. 4, the scented material 415 is suspended by shielded wire 410. Various other materials may be implemented to suspend the scented material in thermal contact with the high resistance wire. As shown in FIG. 4, the high resistance wire 405 is wrapped around the shielded wire 410, which puts the high resistance wire in thermal contact with the shielded wire 410. Accordingly, the shielded wire 410 may increase in temperature level corresponding to the increase in the temperature level of the high resistance wire 405.

The scented material 415 may comprise any material that generates a scent when it is heated and can be suspended in thermal contact with the high resistance wire 405. In various embodiments, the scented material 415 is a composition of a wax and an oil. For example, the wax may comprise bees wax, soy wax, or paraffin wax. Examples of the oil may be essential oil, perfume, or cologne. The ratio of wax to oil may be about 90:10, but is not limited thereto, and the ratios may vary based on preference. In an exemplary embodiment, the ratio of wax to oil may be about 96:4. However, the ratio of wax to oil may be other ratios (e.g., less than and/or greater than 90:10) based on a preference of a user and/or a manufacturer. Moreover, the scented material 415 may be any type of scent, perfume, incense, cologne, flavoring, essence, natural flavor, artificial flavor, herb, and/or odor-producing plant. Furthermore, sambrani, dhoop, and/or any type of smoke-producing/enhancing element may also be utilized to increase an amount of smoke produced during the heating and/or burning of the scented material 415.

The size and shape of the shielded wire 410 that suspends the scented material 415 may vary depending on the expected usage. For example, the shielded wire may be a circle between about 1 mm and 20 mm. The shielded wire 410 may comprise various shapes including, but not limited to circle, oval, square, hexagon, cork-screw, paper clip, and semi-circle. Also, an amount of the shielded wire 410 surrounding the scented material 415 may be adjusted according to an amount of the scented material 415.

Figure 5:
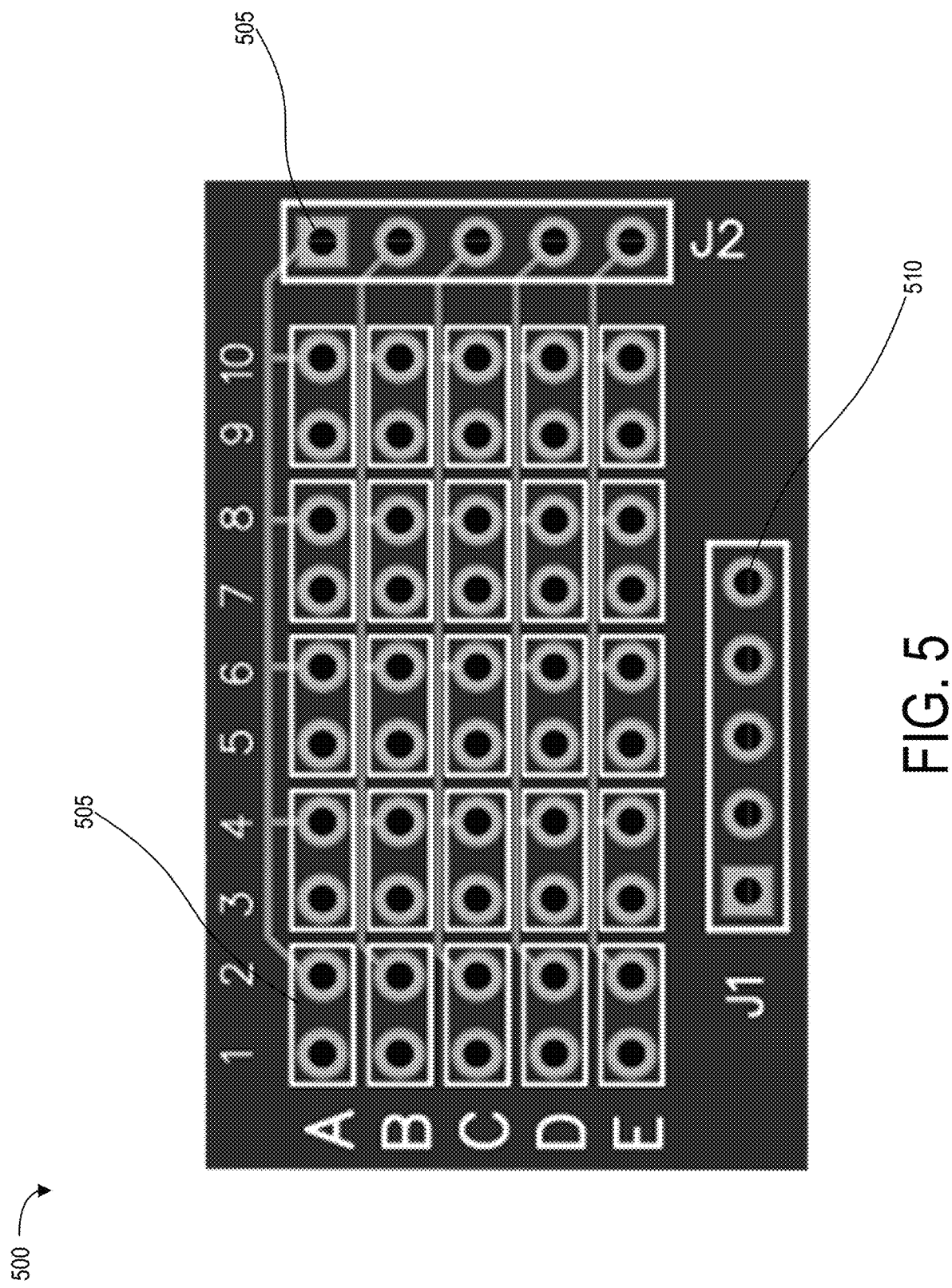
FIG. 5 is a photograph of a front side of a PCB board for an N×N array of heating elements that can generate N×N scents.

Referring to FIG. 5, FIG. 5 is a photograph of a front side of a printed circuit board (PCB) 500 for a 5×5 array of heating elements that can generate 5×5 scents. The heating elements 400 each have two prongs which may be inserted into any one of 25 spaces for the 2-pronged heating elements 400 in the PCB board 500. Current may flow through any one of the 25 two-pinned spaces by opening one of the J1 pins 510 and one of the J2 pins 505. The PCB 500 may control current through opening and/or closing circuit using the switch and/or I/O pins.

In an exemplary embodiment, the J1 pins 510 are connected to the N-channel MOSFET transistors, which are connected to I/O pins A1-A5. The J2 pins 505 may be connected to the P-channel MOSFET transistors, which are connected to I/O pins B1-B5. Current will flow through one pair of spaces in the PCB board 500 when current is opened to one of the J1 pins 510 and one of the J2 pins 505. However, the current may flow through any number of spaces on the PCB board 500 simultaneously based on the scented material desired to be activated.

Figure 6:
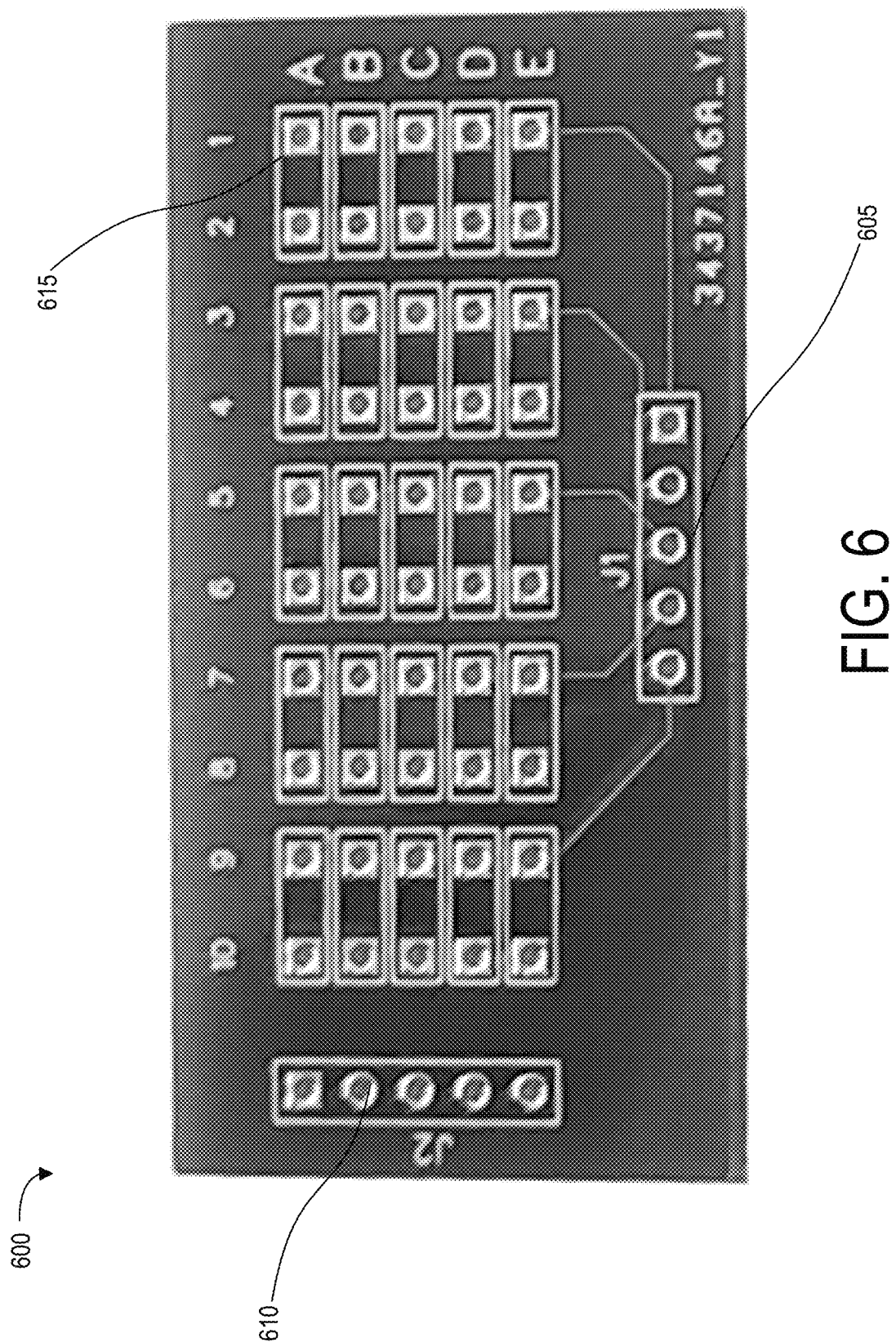
FIG. 6 is a schematic of a back side of a PCB board for an N×N array of heating elements that can generate N×N scents.

Referring to FIG. 6, FIG. 6 is a schematic of a back side of a PCB board 600 for a 5×5 array of heating elements that can generate 5×5 scents. In various embodiments, the PCB board 600 may contain spaces for a different number of heating elements, such as 10×10 or 20×10. Furthermore, the PCB board 600 may be any size as desired by the user and/or the manufacturer.

Figure 7:
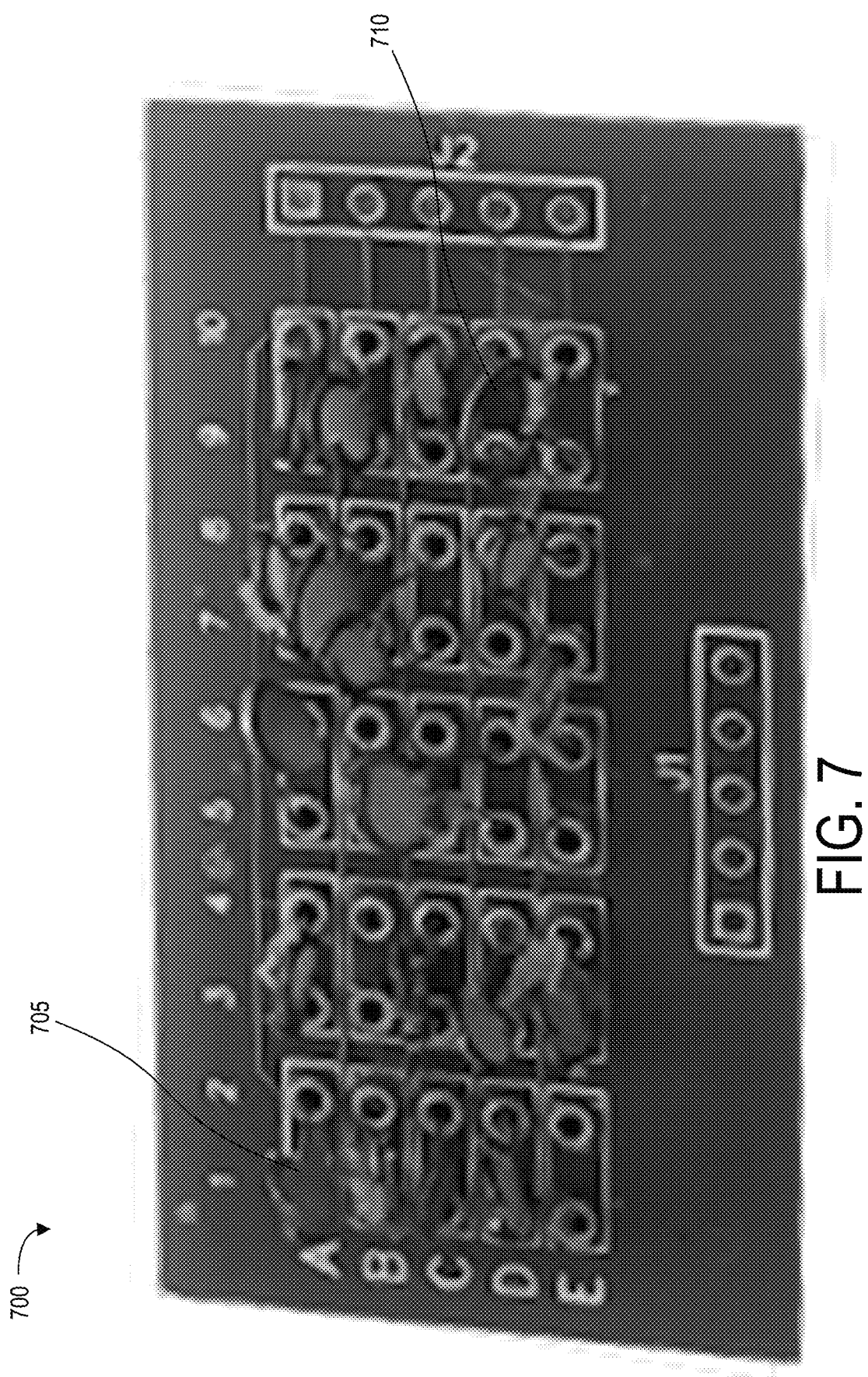
FIG. 7 is a photograph of a front side of a PCB board for a 5×5 array with heating element that hold scented material attached.

Referring to FIG. 7, FIG. 7 is a photograph of a front side of a PCB board 700 for a 5×5 array with heating elements 400 that hold scented material attached. The PCB board 700 includes heating elements 400 for each pair of spaces in the PCB board 700. As shown in the photograph, the shielded wire of heating element 705 suspends a scented material within it. Each of the heating elements 400 in the PCB board 700 may contain a unique scent and may be individually activated. As described above, any number of heating elements 400 may be activated simultaneously to generate different scents based on a combination of the scented material.

When current flows through the heating elements, the scented material burns and gives off a scent. After a prolonged heating, the scented material will burn away leaving an empty space in the heating element 710. In various embodiments, the heating elements may be activated for about 1.25 seconds at a time to flow about 3.7V current through the high resistance wire. The heating elements may be reactivated any number of times until the scented material completely burns away. Subsequently, the heating element 710 may be replaced with another heating element 710 after the scented material has been exhausted.

Figure 8:
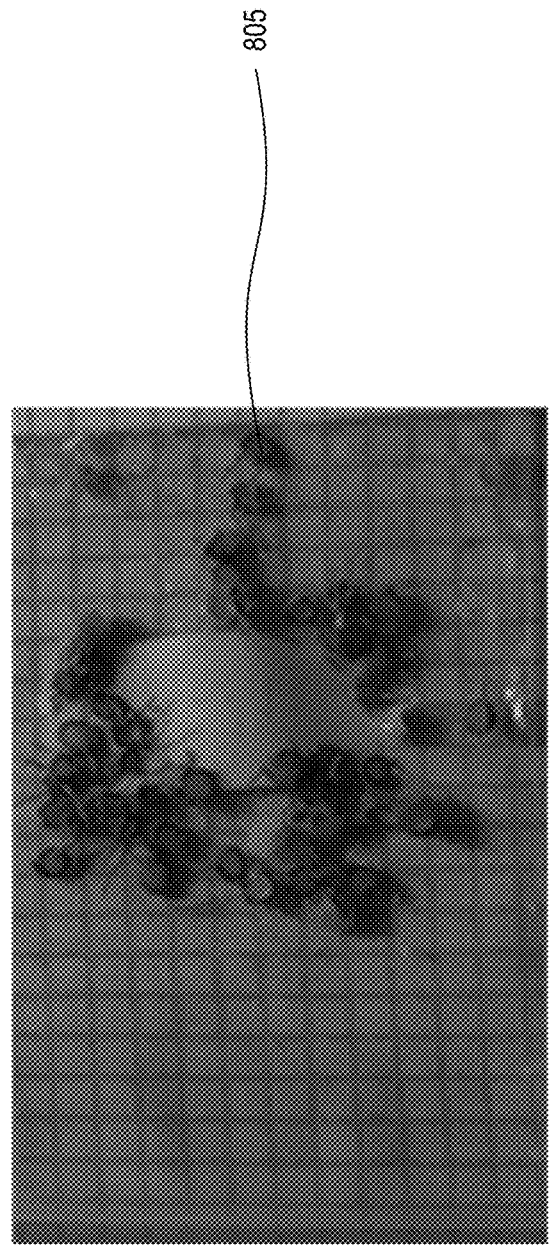
FIG. 8 is a photograph of a multitude of heating elements with scented material suspended therein.

Referring to FIG. 8, FIG. 8 is a photograph 800 of a multitude of heating elements with scented material suspended therein. The various heating elements may be inserted into PCB board to add scents, switch out scents, or replace scents that have burned out. The PCB board may create different scents based on different combinations of the heating elements. The heating elements used may correspond to the digital media.

Figures 9A, 9B:
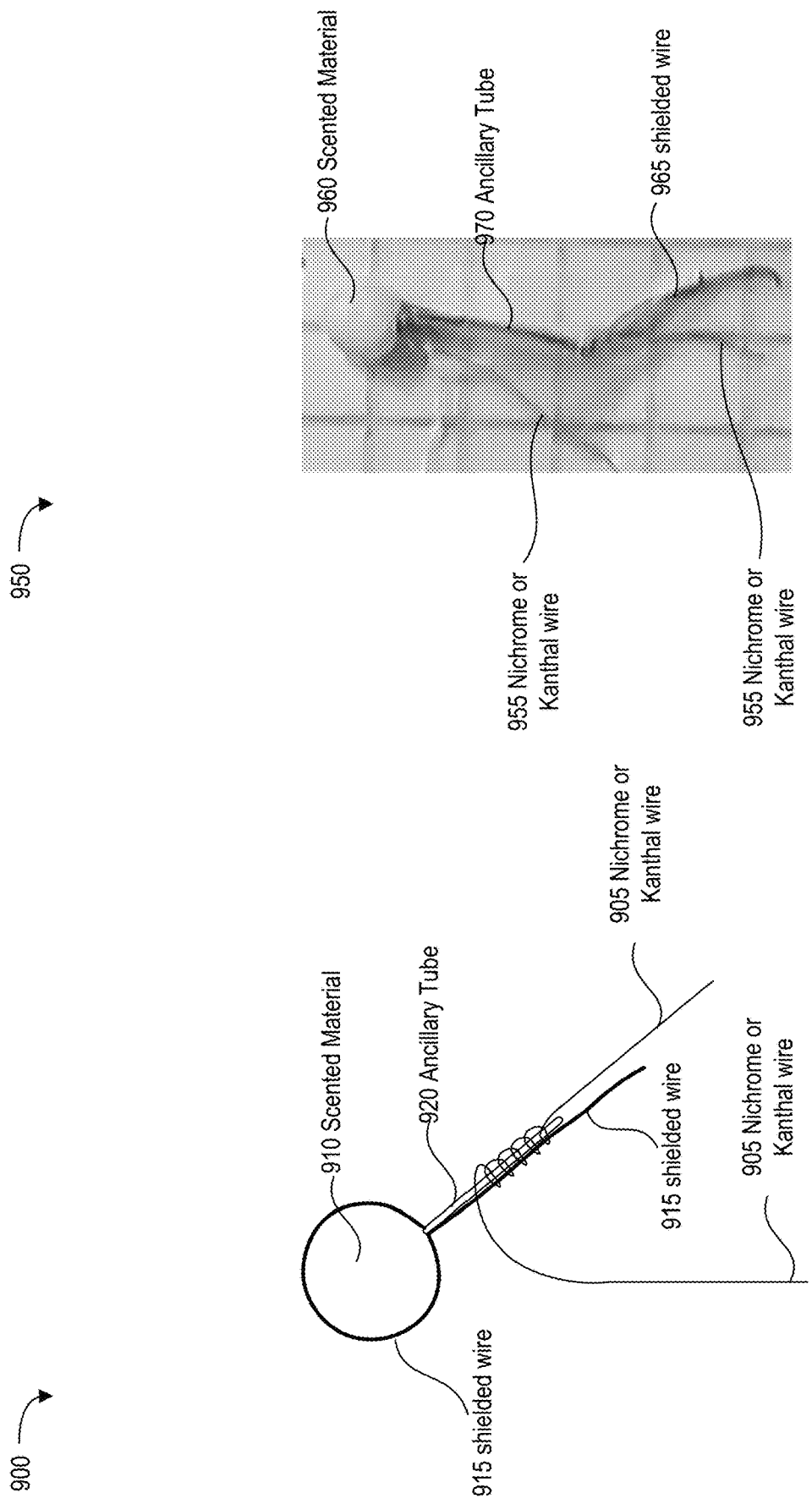
FIG. 9A is an illustration of an embodiment of the heating element that includes an ancillary tube, specifically, a capillary tube.
FIG. 9B is a photograph of an embodiment of the heating element that includes an ancillary tube, specifically, a capillary tube.

Referring to FIG. 9A, FIG. 9A is an illustration 900 of an embodiment of the heating element that includes an ancillary tube 920. The ancillary tube 920 may comprise various materials such as glass or plastic. The heating element includes shielded wire 915 that supports a scented material 910. The high resistance wire 905 is wrapped around the shielded wire 915 and the ancillary tube 920. An end of the shielded wire 915 may also support the ancillary tube 920. The ancillary tube 920 is hollow and is in contact with the scented material 910. Further, the ancillary tube 920 is filled with the scented material 910. The ancillary tube 920 may be used to direct scent from the scented material 910 in a direction away from the ancillary tube 920.

When current is passed through the high resistance wire 905, the high resistance wire 905 heats the ancillary tube 920 and burns the scented material 910 inside the ancillary tube 920. As scented material 910 burns, more scented material is drawn into the ancillary tube 920. In various embodiments, the ancillary tube 920 may be initially empty without scented material inside. When the ancillary tube 920 is heated by the high resistance wire 905, the scented material 910 is drawn into the ancillary tube 920. In other words, heating the ancillary tube 920 generates a lower air pressure therein, such that the scented material is extracted through the ancillary tube 920.

In various embodiments, the use of the ancillary tube may dramatically slow the burning of the scented material 910. Thus, the heating element shown in FIG. 9A may produce scents for a longer period of time compared to the heating element shown in FIG. 4 before the scented material 910 is used up. The width of the ancillary tube 920 may be modified to control the speed at which the scented material 910 burns. Further, the heating element may comprise multiple ancillary tubes 920. Additional ancillary tubes 920 may increase the rate at which the scented material 910 burns. For example, the ancillary tube 920 may have a length requiring longer travel for the scent to travel before being released to an external environment. Also, the ancillary tube 920 may have a shape that requires more travel of the scent to reach the external environment.

Referring to FIG. 9B, FIG. 9B is a photograph of the embodiment of the heating element shown in FIG. 9A, which includes an ancillary tube 970. The ancillary tube 970 is supported by a shielded wire 965. High resistance wire 955 is wrapped around the shielded wire 965 and the ancillary tube 970. The ancillary tube 970 is hollow and is in contact with scented material 960. Accordingly, a temperature level within the ancillary tube 970 may be adjusted (i.e., increase) based on the increase in the temperature level of the high resistance wire 955.

Figures 10A, 10B:
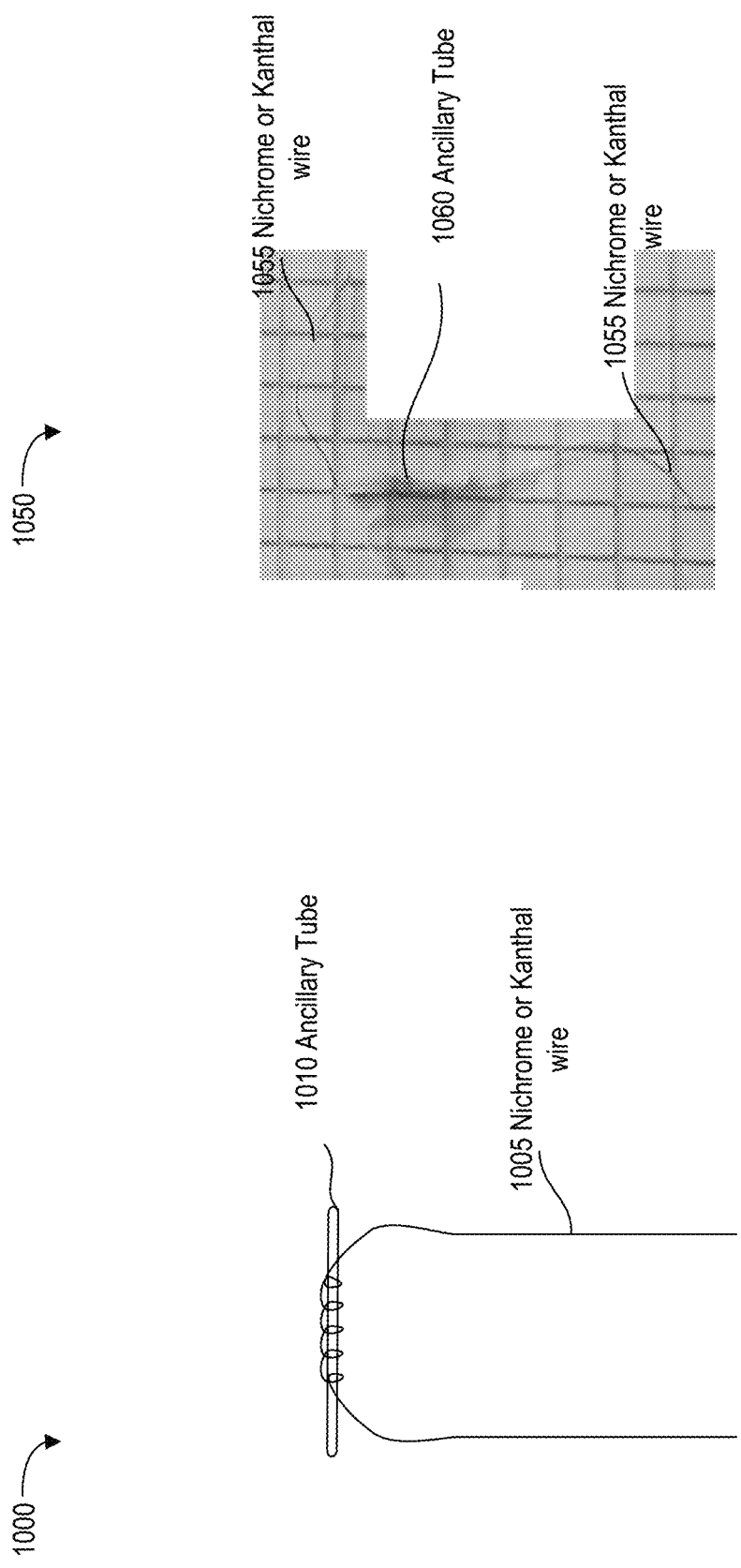
FIG. 10A is an illustration of an embodiment of the heating element that includes an ancillary tube, specifically, a capillary tube.
FIG. 10B is a photograph of an embodiment of the heating element that includes an ancillary tube, specifically, a capillary tube.

Referring to FIG. 10A, FIG. 10A is an illustration 1000 of an embodiment of the heating element that includes an ancillary tube 1010. The ancillary tube 1010 is hollow and contains scented material. A high resistance wire 1005, such as nichrome, Kanthal, or aluminum, is wrapped around the ancillary tube 1010. When current is passed through the high resistance wire 1005, the scented material burns. Vapors of the scented material are expelled from the ancillary tube 1010 to create a scent in the air. As such, the temperature level within the ancillary tube 1010 increases and lower air pressure within the ancillary tube 1010, such that the scented material is extracted through the ancillary tube 1010.

Referring to FIG. 10B, FIG. 10B is a photograph 1050 of the embodiment of a heating element that is shown in FIG. 10A. This embodiment comprises high resistance wire 1055 that is wrapped around an ancillary tube 1060 that is filled with scented material. The scented material is heated and burns when current is passed through the high resistance wire 1055. The two legs of the high resistance wire 1055 may be inserted into pin-holes that connect to a circuit. In various embodiments, the circuit, when activated, generates 3.7 volts for 1.25 seconds. The voltage, time, and current generated by the circuit may comprise any values that heat the scented material to burn. Accordingly, a different voltage level, period of time, and amount of current may be applied to the circuit depending on a type of the scented material to burn (i.e., melt) the scented material.

Figure 11:
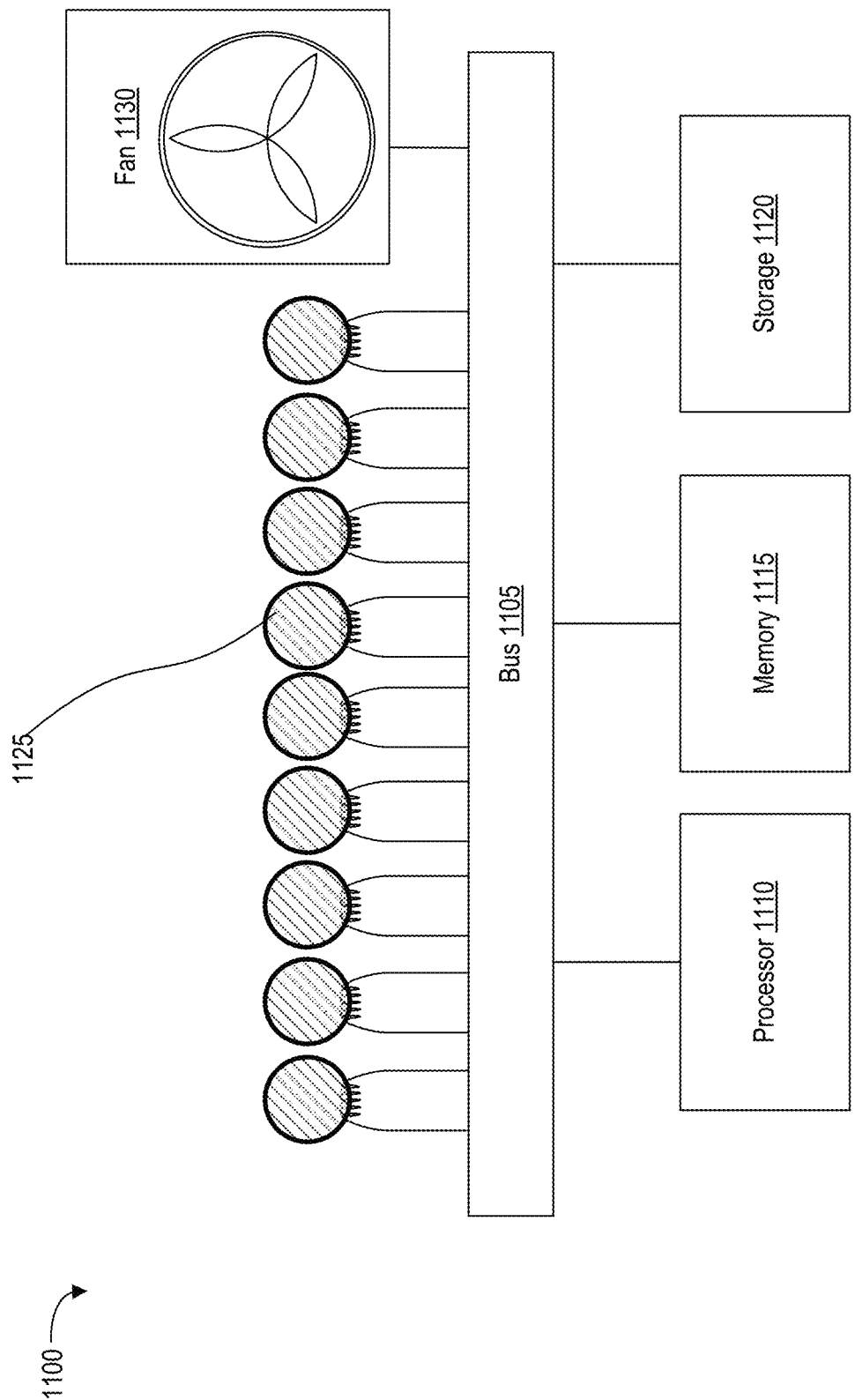
FIG. 11 is a block diagram of a computer system that may implement the disclosed subject matter.

Referring to FIG. 11, FIG. 11 is a block diagram of a computer system 1100 that may implement the disclosed subject matter. The computer system 1100 may be used to connect a circuit to an array of heating elements 1125 on a PCB board. The computer system 1100 may include a bus 1105 that connects various elements of the computer system 1100. The computer system 1100 may be any type of computing device, such as a desktop computer, a laptop computer, a main frame, a terminal, a mobile device, a cell phone, a tablet computer, a personal digital assistant (PDA), and/or any other type of computing device.

The computer system 1100 includes a processor 1110. Examples of the processor 1110 include a central processing unit (CPU), graphics processing unit (GPU), complex programming logic device (CPLD), field programmable gate array (FPGA), and the like. The memory 1115 sends and receives signals to the processor 1110. Examples of the memory 1115 include random access memory (RAM) and read only memory (ROM). The storage 1120 may store instructions and data for long periods of time and while the computer system 1120 is powered off. Examples of storage 1120 include solid state drives and flash drives. The computer system 1100 may further include a communication unit, such as a device capable of wireless or wired communication between other wireless or wired devices via at least one of Wi-Fi, Wi-Fi Direct, infrared (IR) wireless communication, satellite communication, broadcast radio communication, Microwave radio communication, Zigbee, near field communication (NFC), and radio frequency (RF) communication, USB, global positioning system (GPS), Firewire, and Ethernet.

The memory 1115 may transmit instructions from the processor 1110 to open current through one of a multitude of heating elements 1125. Additionally, a fan 1130 may blow air over the multitude of heating elements 1125 to quickly disperse generated scents. Also, the processor 1110 may receive commands from an external device (e.g., a video player, a video game console, a computer) to generate scents from the heating elements 1125 corresponding to content of the video player, the video game console, and/or the computer. For example, a video may have an encoded marker (e.g., a signal) that identifies a type of scent. The processor 1110 and/or a marker detection unit may receive the encoded marker from the communication unit to identify the type of scent. The processor 1110 may decode the encoded marker and activate appropriate heating elements 1125 to generate the scent using at least one scented material.

Also, the signal from the video may be encoded with tones less than 20 Hz or greater than 20 KHz. The signal from the video may be spaced at ten to fifteen second intervals. The encoded marker may be generated using a software application specific to the processor 1110 and/or any other type of programming software.

Figure 12:
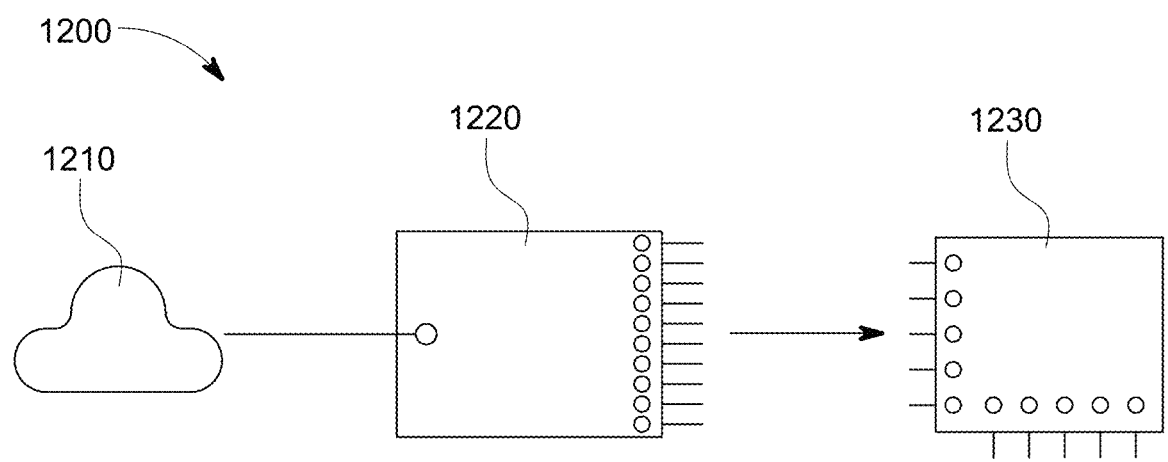
FIG. 12 illustrates a plan view of a burner system, according to an exemplary embodiment of the present general inventive concept.

FIG. 12 illustrates a plan view of a burner system 1200, according to an exemplary embodiment of the present general inventive concept.

The burner system 1200 may include a code receiver 1210, a decoding printed circuit board (PCB) 1220, and a burning PCB 1230, but is not limited thereto.

The code receiver 1210 may be a transmitter, a mobile device, a radio telephone, a cell phone, a computing device, a desktop computer, a laptop computer, a mainframe, and a terminal, but is not limited thereto. Also, the code receiver 1210 may be a device capable of wireless or wired communication between other wireless or wired devices via at least one of Wi-Fi, Wi-Fi Direct, infrared (IR) wireless communication, satellite communication, broadcast radio communication, Microwave radio communication, Zigbee, near field communication (NFC), and radio frequency (RF) communication, USB, global positioning system (GPS), Firewire, and Ethernet.

The code receiver 1210 may the signal and/or the encoded marker thereon from an external source, such as the video player, the video game console, and/or the computer. The code receiver 1210 may transmit the signal and/or the encoded marker therefrom.

The decoding PCB 1220 may be constructed similar to the PCB board 500, the PCB board 600, and/or the PCB board 700 as described above. The decoding PCB 1220 may be physically and/or wirelessly connected to the code receiver 1210 to receive the signal and/or the encoded marker therefrom. Moreover, the decoding PCB 1220 may convert the signal and/or the encoded marker into at least one byte of data. Thereafter, the decoding PCB 1220 may transmit (i.e., output) the at least one byte of data therefrom.

The burning PCB 1230 may be constructed similar to the PCB board 500, the PCB board 600, and/or the PCB board 700 as described above. The burning PCB 1230 may be physically and/or wirelessly connected to the decoding PCB 1220 to receive the at least one byte of data therefrom. The burning PCB 1230 may have the heating element 400, the heating element 710, the heating element 900, and/or the heating element 1050 removably connected thereto. The burning PCB 1230 may identify the at least one byte of data as corresponding to at least one terminal of the burning PCB 1230. For example, the burning PCB 1230 may the identify the at least one byte of data as corresponding to a negative terminal (i.e., ground connection). Alternatively, and/or in addition thereto, the burning PCB 1230 may the identify at least one second byte of data as corresponding to a positive terminal (i.e., power connection, VCC). Therefore, the burning PCB 1230 may create a short in response to connecting the negative terminal and/or the positive terminal. Accordingly, the burning PCB 1230 may generate the at least one scent using at least one of the aforementioned heating elements.

Figure 13:
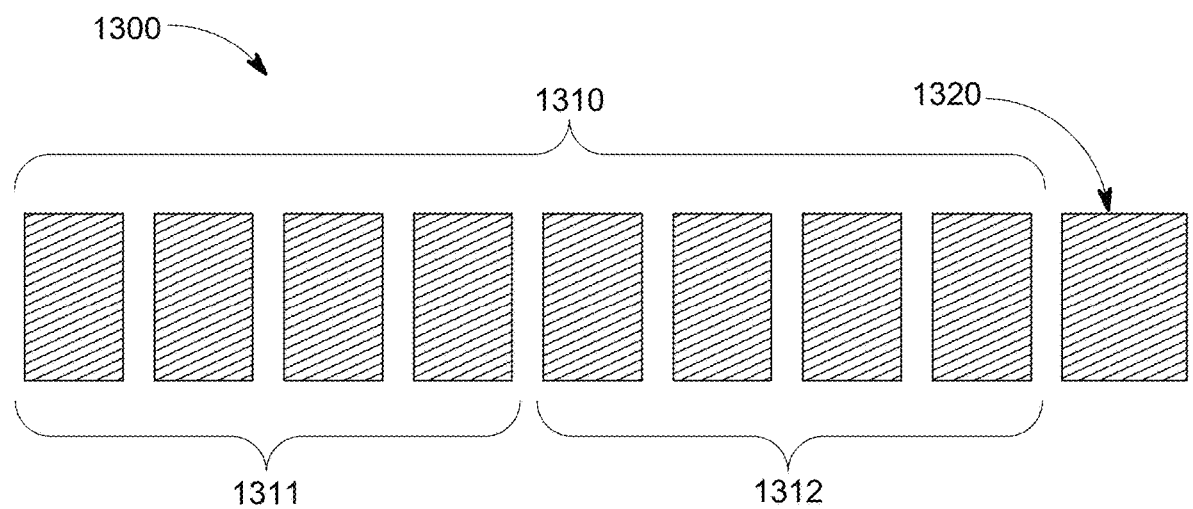
FIG. 13 illustrates a structure of an encoded marker, according to an exemplary embodiment of the present general inventive concept.

FIG. 13 illustrates a structure of an encoded marker 1300, according to an exemplary embodiment of the present general inventive concept.

The encoded marker 1300 may include a full band 1310 and a terminating bar 1320, but is not limited thereto.

The full band 1310 may include a plurality of first bars 1311 and a plurality of second bars 1312, but is not limited thereto.

Referring to FIG. 13, the plurality of first bars 1311 is illustrated to have four bars. However, the plurality of first bars 1311 may be less than four bars or more than four bars.

Referring again to FIG. 13, the plurality of second bars 1312 is illustrated to have four bars. However, the plurality of second bars 1312 may be less than four bars or more than four bars.

Collectively, the plurality of first bars 1311 and the plurality of second bars 1312 form the full band 1310. Each of the plurality of first bars 1311 and each of the plurality of second bars 1312 has a position in the full band 1310. Each of the plurality of first bars 1311 and each of the plurality of second bars 1312 may correspond to a tone, such as less than 20 hertz (Hz) and/or greater than 20 kilohertz (KHz). Moreover, each of the plurality of first bars 1311 corresponds to and/or matches at least one of the plurality of second bars 1312 (e.g., a first of the plurality of first bars 1311 matches a first of the plurality of second bars 1312, a second of the plurality of first bars 1311 matches a second of the plurality of second bars 1312, etc.).

Furthermore, the plurality of first bars 1311 may represent four bytes of data of a binary number (e.g., least significant bit, LSB). The plurality of second bars 1312 may represent another four bytes of data of the binary number. Each of the plurality of first bars 1311 and each of the plurality of second bars 1312 may be equivalent in size and in spacing between each other.

The terminating bar 1320 may be disposed at an end of the full band 1310. The terminating bar 1320 may have a size greater than each of the plurality of first bars 1311 and each of the plurality of second bars 1312.

It is important to note that a number of bars within the full band 1310 may be adjusted (e.g., increased, decreased). However, the number of bars must be equal, such that the number of bars within the plurality of first bars 1311 may be equivalent to the number of bars within the plurality of second bars 1312. In other words, the number of bytes of data must be equivalent. Also, there can never be zero bytes of data, but always have at least one byte of data.

Figure 14:
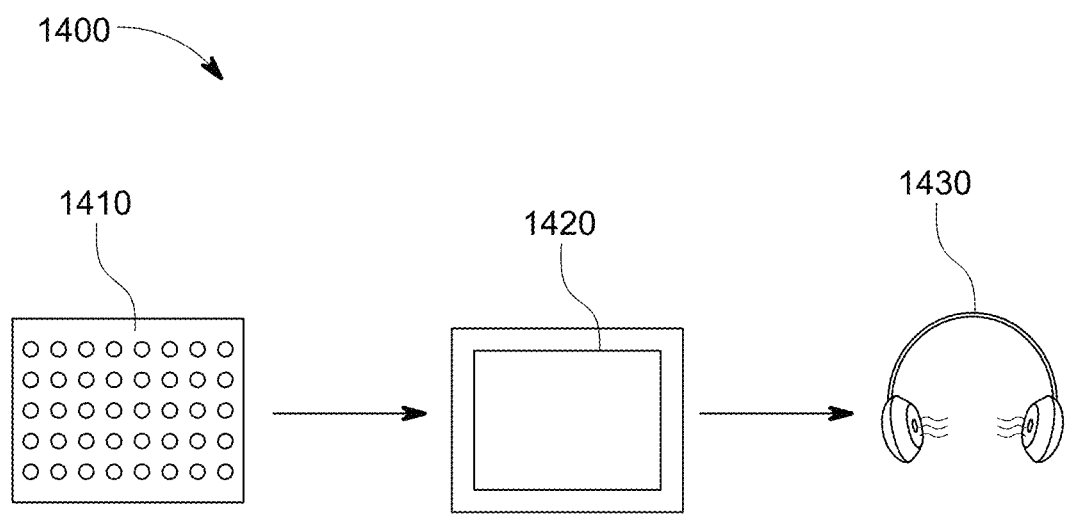
FIG. 14 illustrates a flow chart to generate at least one scent, according to an exemplary embodiment of the present general inventive concept.

FIG. 14 illustrates a flow chart 1400 to generate at least one scent, according to an exemplary embodiment of the present general inventive concept.

At step 1410, an audio data and/or a video data (e.g., a file, byes of data) may be encoded with the encoded marker, such as the encoded marker 1300.

At step 1420, a digital media device (e.g., a video player, a television, a video game console, a computer) may receive the audio data thereon, such as from a broadcaster (e.g., television broadcast, radio broadcast, satellite, cable) to play the audio data and/or the video data.

At step 1430, a burner system, such as the burner system 1200 may be connected to the digital media device and receive the audio data and/or the video data from the digital media device. As such, the burner system 1200 may decode the encoded marker 1300. Accordingly, the burner system 1200 may generate the at least one scent based on the encoded marker 1300.

The present general inventive concept may include a method for generating scents, the method including receiving, by a processing circuit 100, an encoded marker from the digital media device to identify a type of scent, and generating, by at least one heating element 400, a scent in response to receiving a command from the processing circuit 100.

The at least one heating element 400 may include at least one scent producing material 415, and a high resistance wire 405 connected to the at least one scent producing material 415 to generate the scent by heating the at least one scent producing material 415 and convert the at least one scented material 415 into a gaseous state.

The at least one scent producing material 415 may include at least one of a wax, an essential oil, a perfume, a cologne, incense, tobacco, a gel, a rubber, a paste, a glue, and a fiber.

The wax may be constructed of at least one of paraffin wax, soy wax, and bees wax.

The at least one heating element 400 may further include a shielded wire 410 connected to the high resistance wire 405 to suspend the at least one scent producing material 415 therein.

The high resistance wire 405 may be at least partially wrapped around the shielded wire 410.

The at least one heating element 900 may further include an ancillary tube 920 connected to the high resistance wire 905 to extract the scent from the at least one scent producing material 910 therethrough in response to heating the high resistance wire 905.

The method may further include a printed circuit board 500 to connect the processing circuit 100 to the at least one heating element 400

The printed circuit board 500 may generate multiple scents using an array of the at least one heating element 400.

The present general inventive concept may also include a scent generating apparatus 1100 connected to a digital media device, the scent generating apparatus 1100 including a processing circuit 100 to identify a type of scent in response to receiving an encoded marker from the digital media device, and at least one heating element 400 to generate a scent in response to receiving a command from the processing circuit 100.

The at least one heating element 400 may include at least one scent producing material 415, and a high resistance wire 405 connected to the at least one scent producing material 415 to generate the scent by heating the at least one scent producing material 415 and convert the at least one scented material 415 into a gaseous state.

The at least one scent producing material 415 may include at least one of a wax, an essential oil, a perfume, a cologne, incense, tobacco, a gel, a rubber, a paste, a glue, and a fiber.

The wax may be constructed of at least one of paraffin wax, soy wax, and bees wax.

The at least one heating element 400 may further include a shielded wire 410 connected to the high resistance wire 405 to suspend the at least one scent producing material 415 therein.

The high resistance wire 405 may be at least partially wrapped around the shielded wire 410.

The at least one heating element 900 may further include an ancillary tube 920 connected to the high resistance wire 905 to extract the scent from the at least one scent producing material 910 therethrough in response to heating the high resistance wire 905.

The scent generating apparatus 1100 may further include a printed circuit board 500 to connect the processing circuit 100 to the at least one heating element 400.

The printed circuit board 500 may generate multiple scents using an array of the at least one heating element 400.

The present general inventive concept may also include a scent generating apparatus 1100 connected to a digital media device, the scent generating apparatus 1100 including a printed circuit board 500 have an array of pins 510/505, a processing circuit 100 disposed on at least a portion of the printed circuit board 500 to identify a type of scent in response to receiving an encoded marker from the digital media device, and a plurality of heating elements 400 disposed within at least a portion of the array of pins 510/505 to generate at least one scent in response to receiving a command from the processing circuit 100.

At least one of the plurality of heating elements 400 may receive a current in response to the processing circuit 100 opening a circuit on the array of pins 510/505.

The plurality of heating elements 400 may generate the at least one scent based on a combination of the array of pins 510/505 receiving a current.

The at least one scent may be generated by heating, via the plurality of heating elements 400, a scent producing material 415 comprising at least one of a wax, an essential oil, a perfume, a cologne, incense, tobacco, a gel, a rubber, a paste, a glue, and a fiber.

The plurality of heating elements 400 may generate the at least one scent based on a combination of the plurality of heating elements 400 activated.

At least one of the plurality of heating elements 400 may remain inactive while the at least one scent is generated.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A method for generating scents, the method comprising:
    receiving, by a processor, an instruction to generate a first scent; and
    heating, responsive to the instruction to generate the first scent, a first scented material;
    receiving, by the processor, an instruction to generate a second scent; and
    heating, responsive to the instruction to generate the second scent, a second scented material;
    wherein the first scented material and the second scented material are compositions, each composition comprising:
    a wax; and
    a scent producing chemical,
    wherein the heating comprises generating current through a nichrome wire, and the nichrome wire is in thermal contact with the first scented material and second scented material and wherein each composition is suspended in a circular shielded copper wire that is wrapped with the nichrome wire.

2. The method of claim 1, wherein the wax is selected from the group consisting of paraffin wax, soy wax, and bees wax.

3. The method of claim 1, wherein the scent producing chemical is selected from the group consisting of essential oil, perfume, and cologne.

4. The method of claim 1, wherein each composition further comprises a ratio of wax to scent producing chemical of at least one of 9 to 1 and 24 to 1.

5. A scent generating apparatus connected to a digital media device, the scent generating apparatus comprising:

a processing circuit to identify a type of scent in response to receiving an encoded marker from the digital media device; and at least one heating element to generate a scent in response to receiving a command from the processing circuit, wherein the at least one heating element comprises:

at least one scent producing material; and a wire connected to the at least one scent producing material to generate the scent by heating the at least one scent producing material and convert at least a portion of the at least one scent producing material into a gaseous state, wherein the at least one heating element further comprises:

a shielded wire connected to the wire to suspend the at least one scent producing material therein.

6. The scent generating apparatus of claim 5, wherein the at least one scent producing material comprises at least one of a wax, an essential oil, a perfume, a cologne, incense, tobacco, a gel, a rubber, a paste, a glue, and a fiber.

7. The scent generating apparatus of claim 6, wherein the wax is constructed of at least one of paraffin wax, soy wax, and bees wax.

8. The scent generating apparatus of claim 5, wherein the wire is at least partially wrapped around the shielded wire.

9. The scent generating apparatus of claim 5, wherein the at least one heating element further comprises:

an ancillary tube connected to the wire to extract the scent from the at least one scent producing material therethrough in response to heating the wire.

10. The scent generating apparatus of claim 5, further comprising:

a printed circuit board to connect the processing circuit to the at least one heating element.

11. The scent generating apparatus of claim 10, wherein the printed circuit board generates multiple scents using an array of the at least one heating element.

12. A scent generating apparatus connected to a digital media device, the scent generating apparatus comprising:

a printed circuit board have an array of pins;

a processing circuit disposed on at least a portion of the printed circuit board to identify a type of scent in response to receiving an encoded marker from the digital media device; and a plurality of heating elements disposed within at least a portion of the array of pins to generate at least one scent in response to receiving a command from the processing circuit, wherein at least one of the plurality of heating elements receives a current in response to the processing circuit opening a circuit on the array of pins.

13. The scent generating apparatus of claim 12, wherein the plurality of heating elements generates the at least one scent based on a combination of the array of pins receiving a current.

14. The scent generating apparatus of claim 13, wherein the at least one scent is generated by heating a scent producing material comprising at least one of a wax, an essential oil, a perfume, a cologne, incense, tobacco, a gel, a rubber, a paste, a glue, and a fiber.

15. The scent generating apparatus of claim 12, wherein the plurality of heating elements generates the at least one scent based on a combination of the plurality of heating elements activated.

16. The scent generating apparatus of claim 12, wherein at least one of the plurality of heating elements remains inactive while the at least one scent is generated.

* * * * *